United States Patent
Chang et al.

(10) Patent No.: US 9,767,621 B2
(45) Date of Patent: Sep. 19, 2017

(54) VISUALIZATION METHOD AND SYSTEM, AND INTEGRATED DATA FILE GENERATING METHOD AND APPARATUS FOR 4D DATA

(71) Applicant: N3N CO., LTD., Seoul (KR)

(72) Inventors: Taewhan Peter Chang, Seoul (KR); Che Hyun Cho, Seoul (KR)

(73) Assignee: N3N CO., LTD., Seoul (KR)

( * ) Notice: Subject to any disclaimer, the term of this patent is extended or adjusted under 35 U.S.C. 154(b) by 179 days.

(21) Appl. No.: 14/789,932

(22) Filed: Jul. 1, 2015

(65) Prior Publication Data

US 2016/0140771 A1    May 19, 2016

(30) Foreign Application Priority Data

Nov. 19, 2014  (KR) .................. 10-2014-0161653
Jan. 9, 2015   (KR) .................. 10-2015-0003442

(51) Int. Cl.
*G06T 17/00*   (2006.01)
*G06T 19/20*   (2011.01)
(Continued)

(52) U.S. Cl.
CPC ............ *G06T 19/20* (2013.01); *G06F 3/0485* (2013.01); *G06F 3/04845* (2013.01);
(Continued)

(58) Field of Classification Search
None
See application file for complete search history.

(56) References Cited

U.S. PATENT DOCUMENTS 8,566,736 B1 * 10/2013 Jacob ................... G06T 13/20
                                                715/764
2002/0159653 A1 * 10/2002 Dekel ................. H04N 1/3873
                                                382/282
(Continued)

FOREIGN PATENT DOCUMENTS

JP        2009019358 A      1/2009
KR   10-2002-0052190 A1    7/2002
(Continued)

OTHER PUBLICATIONS

Leen-Seok Kang et al. : "Development and Case Study of 4D CAD System for Visualizing Schedule Data of Construction Project" , published on Korean Society for Railway, pp. 373-380, Aug. 2007.

*Primary Examiner* — Ryan M Gray
(74) *Attorney, Agent, or Firm* — Envision USA Inc.

(57) ABSTRACT

The present invention discloses a method for visualizing 4D data by integrating received data, at a server system. The method may include a step of extracting data for extracting layer information representing a relation between items, status information representing state or event of each of the items, and connection information enabling each of the items to be related to internal/external system from received at least one raw data, a step of generating contents for generating an object from the extracted information as and integrally implementing the generated object in a visualization space, and a step of visualization control for visualizing and controlling the generated contents, wherein each of the object and the visualization space may be integrally implemented to 4D data with location information and time information.

30 Claims, 20 Drawing Sheets

(51) Int. Cl.
*G06F 3/0485* (2013.01)
*G06Q 10/06* (2012.01)
*G06F 3/0484* (2013.01)
*H04N 7/18* (2006.01)
*H04N 21/422* (2011.01)
*H04N 21/4223* (2011.01)
*H04N 21/431* (2011.01)
*H04N 21/436* (2011.01)
*H04N 21/81* (2011.01)

(52) U.S. Cl.
CPC ..... *G06Q 10/06393* (2013.01); *G06T 17/005* (2013.01); *H04N 7/181* (2013.01); *H04N 21/4223* (2013.01); *H04N 21/42202* (2013.01); *H04N 21/4312* (2013.01); *H04N 21/43615* (2013.01); *H04N 21/81* (2013.01); *H04N 21/816* (2013.01); *G06F 2203/04806* (2013.01)

(56) References Cited

U.S. PATENT DOCUMENTS

| | | | | |
|---|---|---|---|---|
| 2005/0060300 | A1* | 3/2005 | Stolte | G06F 17/30554 |
| 2006/0044307 | A1* | 3/2006 | Song | G06Q 10/06 345/419 |
| 2006/0156246 | A1 | 7/2006 | Williams et al. | |
| 2007/0055782 | A1* | 3/2007 | Wright | G06T 11/206 709/227 |
| 2009/0119309 | A1* | 5/2009 | Gibson | G06F 17/30572 |
| 2009/0300528 | A1* | 12/2009 | Stambaugh | G06F 3/04817 715/764 |
| 2010/0017733 | A1* | 1/2010 | Barros | G06F 17/30241 715/766 |
| 2013/0321458 | A1* | 12/2013 | Miserendino | H04L 41/0883 345/629 |

FOREIGN PATENT DOCUMENTS

| | | |
|---|---|---|
| KR | 101169093 B1 | 7/2012 |
| KR | 10-2013-0106812 A | 9/2013 |

\* cited by examiner

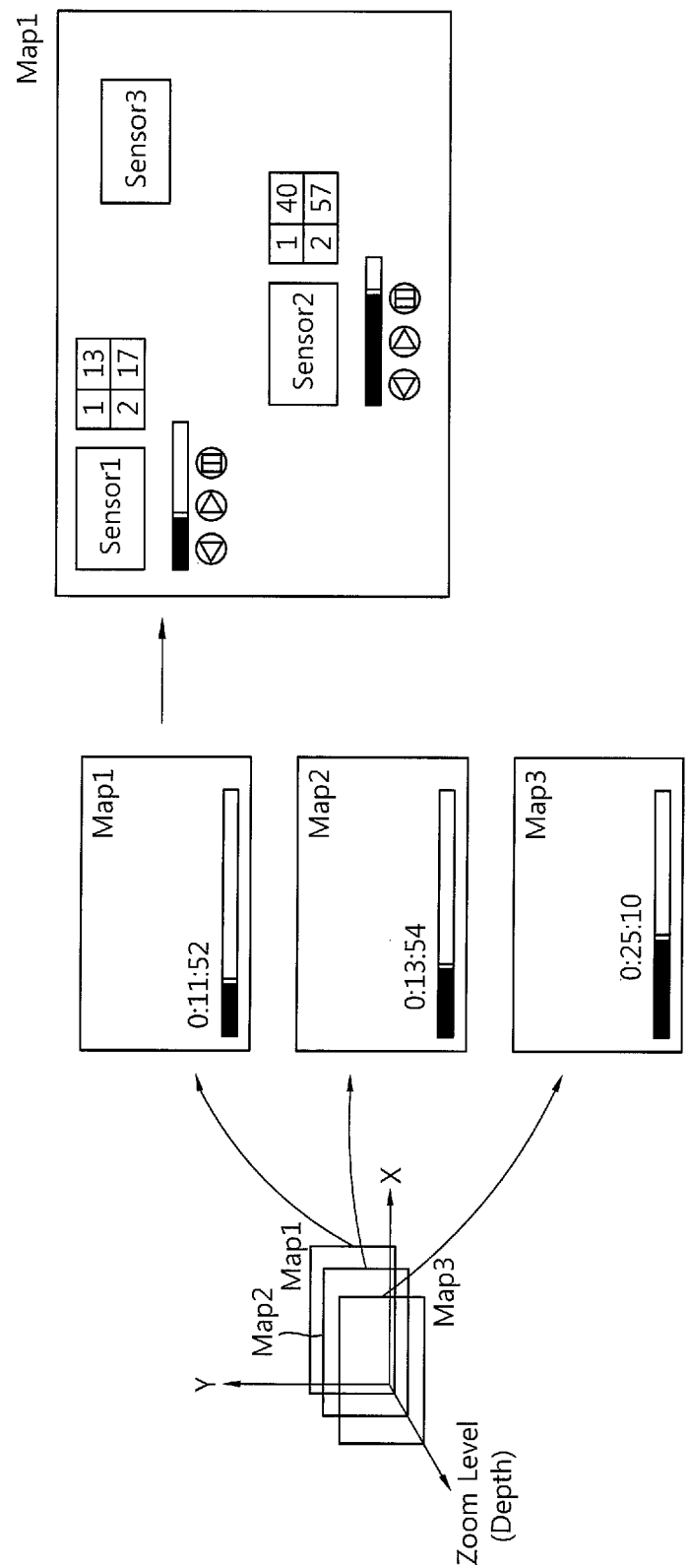

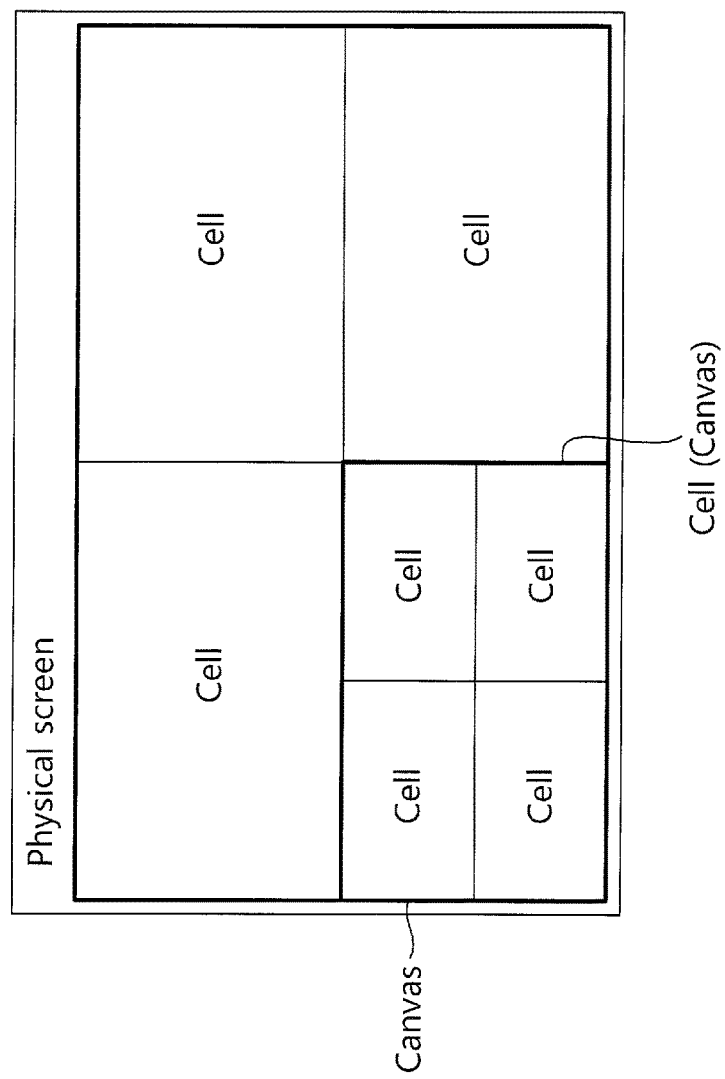

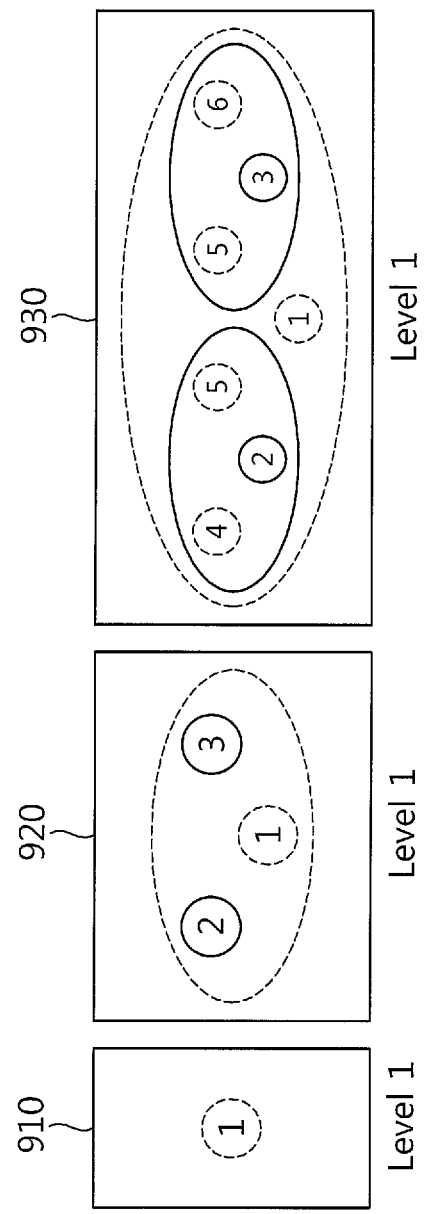

VISUALIZATION METHOD AND SYSTEM, AND INTEGRATED DATA FILE GENERATING METHOD AND APPARATUS FOR 4D DATA

CROSS-REFERENCE TO RELATED APPLICATIONS

This application claims the benefit of priorities of Korean Patent Application No. 10-2014-0161653 filed on Nov. 19, 2014 and Korean Patent Application No. 10-2015-0003442 filed on Jan. 9, 2015, all of which are incorporated by reference in their entirety herein.

BACKGROUND OF THE INVENTION

Field of the Invention

The present invention relates to a visualization method and system, and integrated data file generating method and apparatus for additionally generating and displaying 4D scheme data while maintaining the conventional 2D and 3D display scheme in data visualization systems and more particularly, to a visualization method and system, and integrated data file generating method and apparatus for generating 4D data based on raw data, and easily and rapidly displaying the generated 4D data.

Discussion of the Related Art

Generally, a data visualization method has a general display method for each sort of data. For example, in case of one dimensional data, a time series data display method is used, and two dimensional data is displayed as data of map shape such as a plot chart. And three or more dimensional data is displayed by adding variety to colors or sizes of items in a chart displayed in two dimensional data display method.

However, users are finding it difficult to be accustomed to the data visualization method in which such a general display method is applied since sizes and generation cycles of data used by the users become bigger and faster uncomparable to those of the past. In addition, products of being hardly made only intensify confusion but are unable to play the role of useful information. Thus, the more data is visualized, the more difficulty is added on users in reading and interpreting the visualized data. As a result, it is hard for users to attain the original intention of data visualization that makes the data clearly interpreted and effectively shared.

Accordingly, a new data visualization and an effective data storing method for this are required while maintaining the conventional data visualization display method, that is, the time series display method that displays the one dimensional data and the map shape data display method that displays two or more dimensional data, and for this, the following a few methods have been proposed.

First, a method of processing multi-dimensional variables with a pivot function, not with a fixed data display method is devised as follows (Systems and methods for visualizing multi-dimensional data in spreadsheets and other data structures, European Registered Patent 01077420, registered on Oct. 10, 2007). Herein, users are provided with a visualization method for at least multi-dimensional data, but still provided with only 2D data display through two axes. And, by the visualization method, it is not available to identify which data is prior in a data interpreting procedure. In addition, in a procedure of inquiring data, desired results are obtainable only after several interactions with a system or software (S/W).

Second, there is a method of visualization in a way of pivoting data by constructing the multi-dimensional data in cube shaped or numerating the data of many variables at a time (A computer system and method for inquiring and visualizing multi-dimensional database, Japan, published on Nov. 24, 2006).

As such, although a method is devised to enable users to see more data at a time through a way of numerating and integrating one and two dimensional display method and providing it with one display, the more data exist, there are more restrictions in interpretation. In addition, the more data are displayed on a screen, the more interaction users are required to go through, which makes problems in usability for uneducated users.

Consequently, a few methods described above meet the basic intention of visualization that displays data, but there are difficulties in attaining the ultimate objective of fast acquiring data through visualization and fast decision making through it.

SUMMARY OF THE INVENTION

An object of the present invention to solve the problem of described above is to provide a new way of visualization and integrated file generating method and system for the same in big data times which enables users to intuitively determine data and to make decision, different from the conventional data visualization method and data storing method for it.

Another object of the present invention to solve the problem of described above is to increase a business performance management (BPM) speed and to decrease a mean time to repair (MTTR) of users through a new way of visualization methodology and data storing technique while maintaining most visualization method provided by the conventional visualization system.

In an aspect, a method for visualizing 4D data by integrating received data, at a server system of the present invention to accomplish the purpose described above may include a step of extracting data for extracting layer information representing a relation between items, status information representing state or event of each of the items, and connection information enabling each of the items to be related to internal/external system from received at least one raw data, a step of generating contents for generating an object from the extracted information and integrally implementing the generated object in a visualization space, and a step of visualization control for visualizing and controlling the generated contents, wherein each of the object and the visualization space may be integrally implemented to 4D data with location information and time information.

The raw data may include at least one of an image, a video, a text, GIS information, sensor data, system data and facility data.

All resources are implemented to be integrated by decreasing network usage, by utilizing a pixel on demand (POD) technique.

A part of the data may be transmitted by controlling a resolution and a transmission quantity of the data transmitted from contents server to a client at one time by using a tile service if required.

The step of generating contents may include a step of generating a map for generating a map having a data structure in which the object objected from each of the items of the extracted information is integrally implemented in the visualization space, wherein each of the map, the object and the visualization space may be implemented to 4D data with being integrated with having each location information and time information.

Two axes among three axes for displaying 3D data may be displayed as 2D canvas, and one axis may be displayed in zoom level displaying a depth, and wherein the maps of each of the zoom level visualizes 4D data by being implemented to have time axis.

Each of the objects integrated in the map may be displayed by defining attribute, on the 4D visualization space where time is included, and wherein attribute information of the object may include information related to at least one of an actual physical file location, a location on a user interface, a color, a font and a background.

An integrated file may be located in a sharable centralized disk and a link of the file is used in actual map file format, in case of a resource that uses larger amount of disk than a reference value in generating the map.

A generating method of the map may have an automatic and manual generating manner, and in case of automatic map generation, wherein the map data may be generated using location template information for specifying spatial and layer arrangement of the map, tile information for generating background information, project configuration information for generating dynamic contents, a rule script defining the object displayed in the map and a run scheduler determining receiving cycle of the raw data and execution order of map generating operation, which are configuration information for integrating the extracted information.

In case of manual map generation, all raw data may be generated to the object and arbitrarily arranged in the visualization space, and the map is generated manually through a attribute change of each of the objects.

A state of higher level item may be determined by reflecting state value of the lower level item in a plurality of maps.

The integrated contents including the generated map may be provided through one file or a centralized DB system.

In the step of visualization control, the client may visualize the map through a map editor for editing a visualized screen and a viewer for visualizing the map.

The viewer may move by implementing zoom in/zoom out on the integrated contents that integrate a plurality level of maps vertically/horizontally, and configured to visualize a required part in one level of map through a panning.

The viewer may have a canvas which is a user interface visualization space for displaying the integrated map contents on a user interface, and the canvas may have a time axis and in which data of specific time slot is inquired and played back through a change of the time axis.

Each of the objects of the integrated map may have separate time axis in addition to the canvas of the viewer, and the time axis of each object may be configurable separately from the time axis of the canvas.

The canvas of the viewer may be distinguished by at least one cell, and wherein one map or at least one object is displayed in the distinguished cell.

The canvas may be usable by dividing a plurality of typical or atypical cells arbitrarily, and divided cell may be integrated into one cell and the integrated cell becomes the canvas.

The screen configuration once divided may be configured to be reconfigured according to later request with being template through a bookmark function.

Each of divided cells of the view may be implemented to display the map or the object on different time axes.

In case of magnifying the specific item in the center in the current level visualized in each canvas of the viewer, related data corresponding to the specific item may be automatically displayed in a next level.

A data search range may be automatically configured in a range of physical screen currently displayed, in case of searching integrated data in the viewer or the editor.

The map editor may generate contents by changing a link configuration between maps or configuring link between a specific map and an external medium.

The map editor may be available to arbitrarily generate or change a plurality of layer information each generated, the status information and the connection information.

The layer information, the status information and the connection information may be periodically saved, and playback by adjusting a time axis of information in which the client is stored by generating the map, when saving data for integrating and visualizing data received from the server system.

The layer information, the status information and the connection information received from the server system may be collected with different collecting cycles and visualized with different map generating cycles.

In other aspect, a system for visualizing 4D data by integrating received data of the present invention to accomplish the purpose described above may include a contents generating server for extracting layer information representing a relation between items, status information representing state or event of each of the items, and connection information enabling each of the items to be related to internal/external system from received at least one raw data and for generating an object from the extracted information and integrally implementing the generated object in a visualization space, and a media distribution server for distributing the generated contents, wherein each of the object and the visualization space may be integrally implemented to 4D data with location information and time information.

In another aspect, a method for generating a file integrating received data, at a server system of the present invention to accomplish the purpose described above may include a step of extracting data for extracting layer information representing a relation between items, status information representing state or event of each of the items, and connection information enabling each of the items to be related to internal/external system from received at least one raw data, and a step of generating contents file for generating an object from the extracted information and generating in a form of file by integrally implementing the generated object in a visualization space, wherein each of the object and the visualization space may be integrally implemented to 4D data with location information and time information.

In another aspect, an apparatus for generating file by integrating received data of the present invention to accomplish the purpose described above may include a data extracting unit for extracting layer information representing a relation between items, status information representing state or event of each of the items, and connection information enabling each of the items to be related to internal/external system from received at least one raw data, and a contents file generating unit for generating an object from the extracted information and generating a form of file by integrally implementing the generated object in a visualization space, wherein each of the object and the visualization space may be integrally implemented to 4D data with location information and time information.

A method for visualizing 4D data by integrating received data, at a server system of the present invention to accomplish the purpose described above may include a step of extracting data for extracting layer information representing a relation between items, status information representing state or event of each of the items, and connection information enabling each of the items to be related to internal/external system from received at least one raw data, a step of generating contents for generating an object from the extracted information and integrally implementing the generated object in a visualization space, and a step of providing visualization tool for providing a client viewer or an editor enabling the client to control the visualization space, wherein each of the object and the visualization space may be integrally implemented to 4D data with location information and time information.

BRIEF DESCRIPTION OF THE DRAWINGS

FIG. 4a is a conceptual diagram for describing a configuration for implementing and storing a time axis in map data according to an embodiment of the present invention.

FIG. 6 illustrates a display showing map data by splitting a plurality of cells in a canvas.

FIG. 9c is a diagram illustrating a predefined method displaying data.

DETAILED DESCRIPTION OF THE INVENTION

Figure 1:
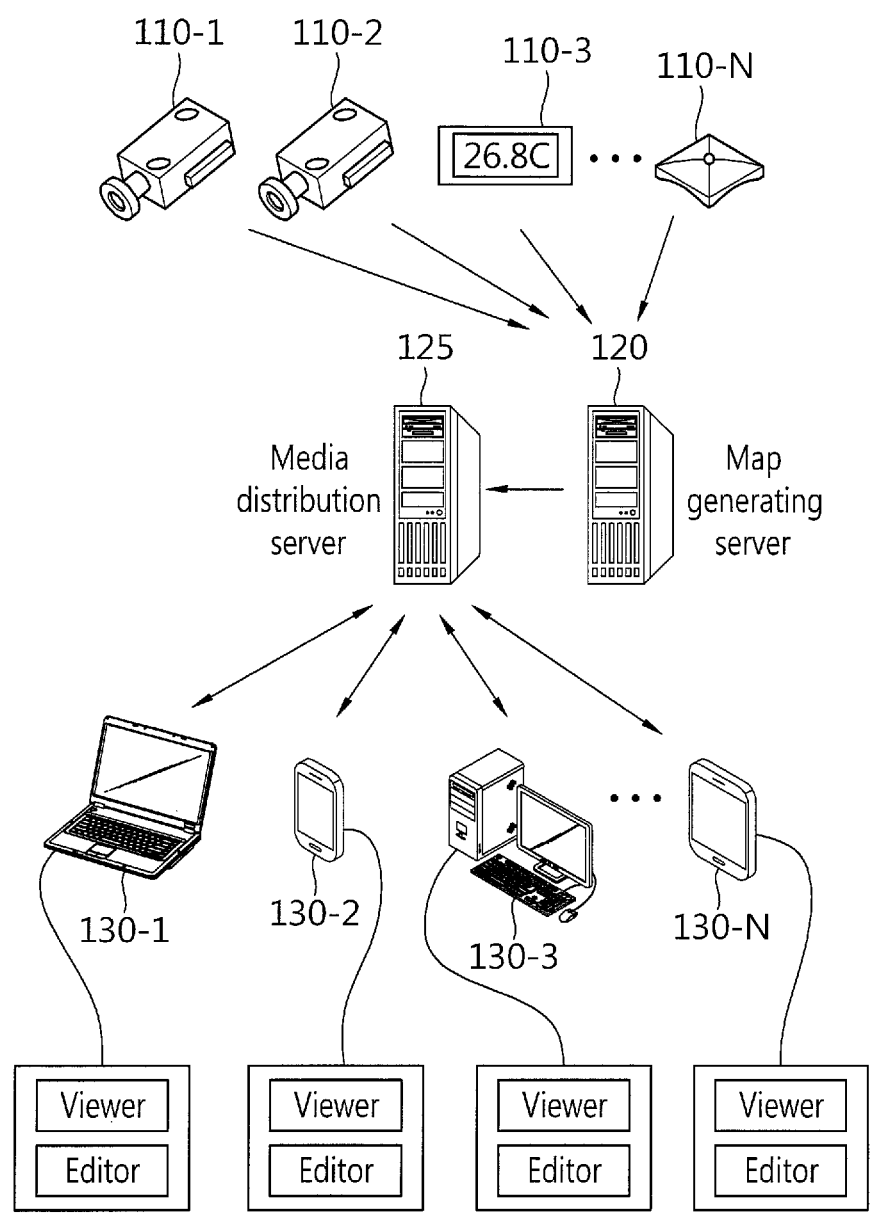
FIG. 1 illustrates a system to which a visualization method according to an embodiment of the present invention can be applied.

The inventive subject matter now will be described more fully hereinafter with reference to the accompanying drawings, in which embodiments of the present invention are shown.

However, the present invention may be embodied in many different forms, modifications, equivalents and alternatives, which are included in the inventive concept and scope, and should not be construed as limited to the embodiments set forth herein.

Although the terms first, second, etc. may be used herein to describe various elements, it will be understood that these elements should not be limited by these terms. These terms are only used to distinguish one element from another. For example, a first element could be termed a second element, and similarly, a second element could be termed a first element without departing from the scope of the present invention. Herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening element present.

The terminology used herein is for the purpose of describing particular embodiments only and is not intended to be limiting of the present invention. As used herein, the singular forms are intended to include the plural forms as well, unless the context clearly indicates otherwise. It will be further understood that the terms "comprise" or "include" etc. when being used in this specification specify the presence of stated features, numbers, steps, operations, elements, components or combination of these things, but do not preclude the presence or addition of one or more other features, numbers, steps, operations, elements, components or combination of these things.

Unless otherwise defined, all terms including technical or scientific terms used herein have the same meaning as commonly understood by one of ordinary skill in the art to which the present invention belongs. It will be further understood that the terms such as those defined in commonly used dictionary should be interpreted as having a meaning that is consistent with their meaning in the context of the relevant art, and will not be interpreted in an idealized or overly formal sense unless expressly so defined herein.

The inventive subject matter now will be described more fully hereinafter by reference to the accompanying drawings, in which embodiments of the present invention are shown. In describing embodiments of the present invention, the same reference numeral is used for the same element even in order to be easily understood throughout the specification, and the redundant description for the same element will be omitted.

In the present specification, terminologies are defined as follows.

A map signifies an integrated data which an object is integrally implemented in visualization space by including a time axis. The map is also referred to as map data.

An object is a data object, and which is what raw data is objected in order to be represented on the map. For example, the object may include data such as temperature information. Since each data includes time information, the object may be mapped in the visualization space with being implemented to include time information. The visualization space represents display space that displays the object, and a plurality of objects may be represented in the visualization space.

An item signifies information extracted from raw data, and the item may become the object if the item is implemented to include metadata and the like in the map.

A canvas is what is constructed using a screen as a logical view, and may be divided as a plurality of typical or atypical cells. That is, what is formed by dividing the canvas is referred to as a cell, and the cell may also be divided into plural number. In each cell, the map data and the object may be individually accommodated. A plurality of objects may be accommodated in each cell. Also, camera images may be accommodated in the cell.

A viewer is the software to display the map data on a display screen of a client, and an editor is the software operated in the client to easily edit a screen configuration of the map data which is displayed through the viewer.

Contents may be provided with one storytelling form with a user's experience being inserted as a complete form of information including at least one map data. A user may generate contents based on user's experience by arbitrarily configure an inter-map link relation for a user convenience or by including a link between the map and external data.

FIG. 1 illustrates a system to which a visualization method according to an embodiment of the present invention can be applied. As shown in FIG. 1, the visualization system according to an embodiment of the present invention may include raw data providing units 110-1~, 110-2, 110-3, . . . , 110-N, a map generating server 120, a media distribution server 125 and a plurality of clients 130-1, 130-2, 130-3, . . . , 130-N.

Referring to FIG. 1, the raw data providing units 110-1 to 110-N sense the raw data (the raw data may be related to breakdown) related to a state of the target equipment, and transmit the sensed raw data to the map generating server 120. The raw data providing units 110-1 to 110-N may be sensors to observe the state of the target equipment for sensing, for example, may include sensors that are able to detect defective equipments. For example, the raw data providing units 110-1 to 110-N may include a temperature sensor, a rotation sensor, a humidity sensor, a contact failure sensor, a fuel sensor, a voltage/current sensor, an oxygen sensor, a passenger counting sensor, a GPS sensor, an infrared sensor, an earth magnetic field sensor, etc. The sensor is not limited to the sensors. The raw data providing units 110-1 to 110-N may include an IP camera, a digital or analogue camera and a video server (not shown). The information sensed by the raw data providing units 110-1 to 110-N may include at least one of image data, video data, text data, polygon data, GIS data, sensor data, system data and facility data. Herein, the video data may be digital stream encoded through a method such as MPEG-4, H.264, high efficiency video coding (HEVC), and the like.

The sensed information may be transmitted to the map generating server 120 using a wired/wireless network (not shown). In some cases, the video data may be directly inputted to the media distribution (MD) server 125 and may be streamed to the clients 130-1 to 130-N with the map data. The network through which information is transmitted and received may include long term evolution (LTE), 3G network, Wibro, wireless local area network (WLAN), and so on.

The IP camera, the analogue or digital camera may signify a camera that captures images and generates compressed digital image stream. The IP camera, the analogue or digital camera may capture images with a predetermined resolution, and the captured video image may be provided for the clients 130-1 to 130-N with high definition even in low bandwidth through the pixel on demand (POD) technique.

The raw data providing units 110-1 to 110-N may be comprised of an arbitrary image server (not shown) that provides images, for example, a video on demand (VOD) server. Also, a plurality of the raw data providing units 110-1 to 110-N may be comprised, and may directly transmit data to the map generating server or the media distribution server 125 using a wired/wireless network.

The map generating server 120 may generate 4D integrated data by extracting status information and event information from the raw data provided from the raw data providing units 110-1 to 110-N. The map generating server 120 may generate metadata based on the extracted status information and event information, and may configure one storable map data by integrating the metadata with the metadata of visualization space which is used as a background of user interface. The metadata generated in the map generating server 120 may include information related to a display location, and data related to a color, a font and a background of the extracted state and event data from the raw data. A tile image integrated with the raw data may include a dynamic tile image. The integration of data may be performed using intelligent pixel query (IPQ) and pixel on demand (POD) techniques. The IPQ technique and the POD technique will be described in detail with reference to FIG. 15.

In this time, each cell included in the canvas may have respective time axis, and is available to inquire data according to time. The time axis may also be implemented in the visualization space as well as in the data object included in each cell. The integrated 4D map data and the object may be displayed in a cell, and a plurality of cells may be displayed on the canvas in various arrangements.

The media distribution server 125 transmits the 4D data integrally generated in the map generating server 120 by distributing the 4D data within output requirement of the clients 130-1 to 130-N. The media distribution server 125 may stream the video data that are separately inputted to the clients 130-1 to 130-N through a link with the map data. That is, in case of the raw data that uses large amount of disk such as images as well as videos, the files may be stored in a centralized sharable disk and the links to the corresponding files may be used in actual map files. In this time, the POD technique may be used in order to raise the efficiency in network resources.

The clients 130-1 to 130-N may receive the 4D data transmitted from the media distribution server 125 and display it through the user interface. The clients 130-1 to 130-N may include a desktop PC, a tablet PC, a smart phone, a notebook PC, a laptop PC, a monitor, a TV, and so on. In addition, the clients 130-1 to 130-N may include other sorts of devices including a display device and an input device. A viewer and an editor may be executed in the clients 130-1 to 130-N. The viewer and the editor may be distributed through the map generating server 120 or the media distribution server 125. The viewer is the software that visualizes the generated 4D map data, and displays the 4D data to users of the clients 130-1 to 130-N, helps to inquire and search desired data, to set the number of cells in the canvas and to arrange the cells. The editor provides an editing tool that enables the users of the clients 130-1 to 130-N to edit the visualization of the map data such as generation of contents based on user's experience according to the convenience of users.

Figure 2:
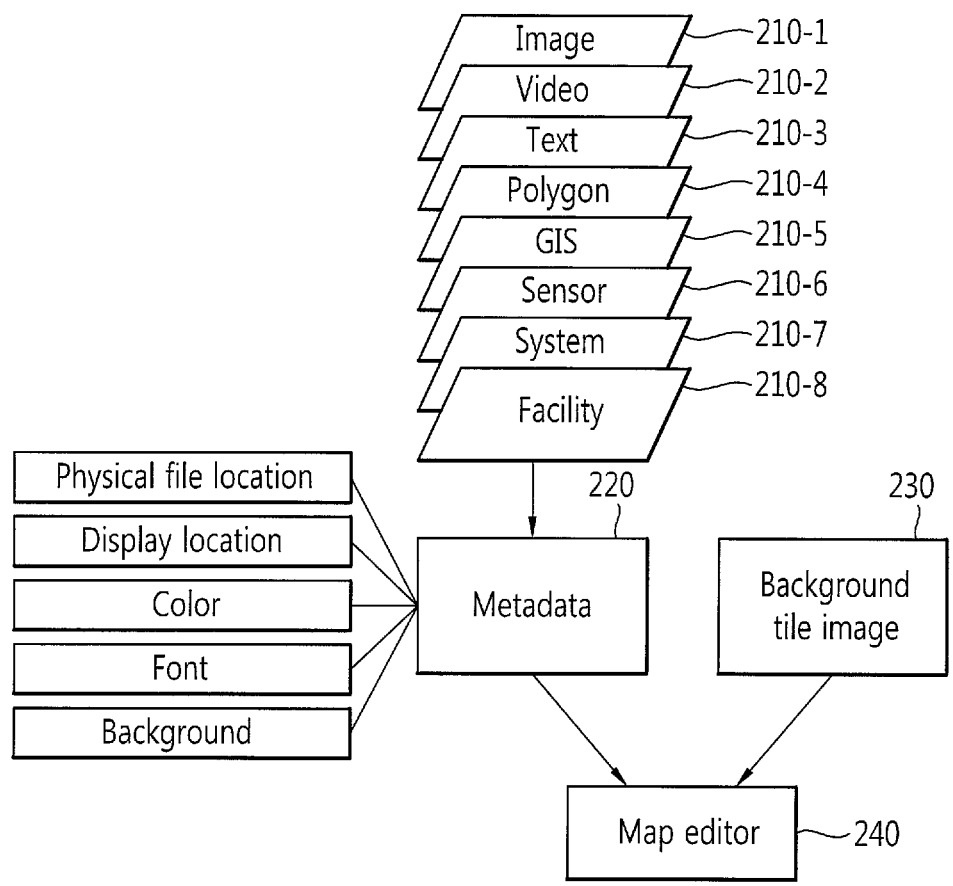
FIG. 2 is a block diagram for describing a concept of generating 4D map data by integrating raw data according to an embodiment of the present invention.

FIG. 2 is a block diagram for describing a concept of generating 4D map data by integrating raw data according to an embodiment of the present invention.

Referring to FIG. 2, the map generating server generates metadata 220 by parsing the raw data 210-1, 210-2, 210-3, 210-4, 210-5, 210-6, 210-7 and 210-8 that are received from the raw data providing unit. The received data 210-1, 210-2, 210-3, 210-4, 210-5, 210-6, 210-7 and 210-8 may include at least one of image 210-1, video 210-2, text 210-3, polygon 210-4, GIS data 210-5, sensor data 210-6, system data 210-7 and facility data 210-8. The server may store the received raw data 210-1, 210-2, 210-3, 210-4, 210-5, 210-6, 210-7 and 210-8 in an arbitrary database (including temporary storage and mass database) in real-time. In this time, it may be displayed that specific raw data is received at a specific time including time information in the raw data.

And, the map generating server generates metadata 220 required to integrate data of different attributes. The metadata 220 may include at least one of location (location displayed on a screen), color, font, and background information. If the map generating data is stored in a form of file, the metadata for physical location of the file (physical location where the received data is stored in a form of file) may be simultaneously generated. The map data 240 may be generated by integrating the generated metadata 220 and a background tile image 230.

Regarding the implementation of 4D map data, although a method of displaying 3D space in 2D is required to express the conventional 3D data, all data objects and the visualization space itself should have a concept of time in order to display 4D data.

Accordingly, the 4D data may be displayed by two axes of three axes of the conventional 3D in a 2D canvas, and displayed in a zoom level displaying a depth using the remainder one axis. In this time, each of the zoom levels may be implemented to have a time axis. Consequently, time axes are implemented in all objects and visualization spaces, and a specific format for generating/storing such data may be called the map 240. Such map data 240 may be comprised of a storable file or DBMS by integrating the metadata 220 such as an actual physical location of file of heterogeneous data, a location on a user interface, a color, a font and a background, etc. and the metadata 230 of a tile image used as a final background of the user interface.

In addition, as described above, by considering the IPQ and the POD on integrating the map data 240, it may be implemented to synchronize and store a location on a local user interface and a location on the GIS as well as the high definition video and image may be implemented with low bandwidth. The description for the IPQ and POD techniques will be described below with reference to FIG. 14 and FIG. 15.

Such map data 240 may be shared by the clients through the media distribution server, and a viewer (not shown) may be used to display the shared map data 240.

The characteristics of the map data 240 are as follows: i) In case of the resources that use large amount of disk such as the image 210-1 and the video 210-2, the files are to be located in a centralized sharable disk, and the links to the corresponding files may be used in actual map data 240. In addition, ii) if necessary, all resources including the image 210-1 or the video 210-2 may be bound in one file and provided. Further, iii) each of the objects as well as the space on which the data is displayed has visualization information of the data that it is to display, and iv) the object and the visualization space may include local/global location information based on the GIS. Lastly, v) all data may include the POD technique.

Figure 3:
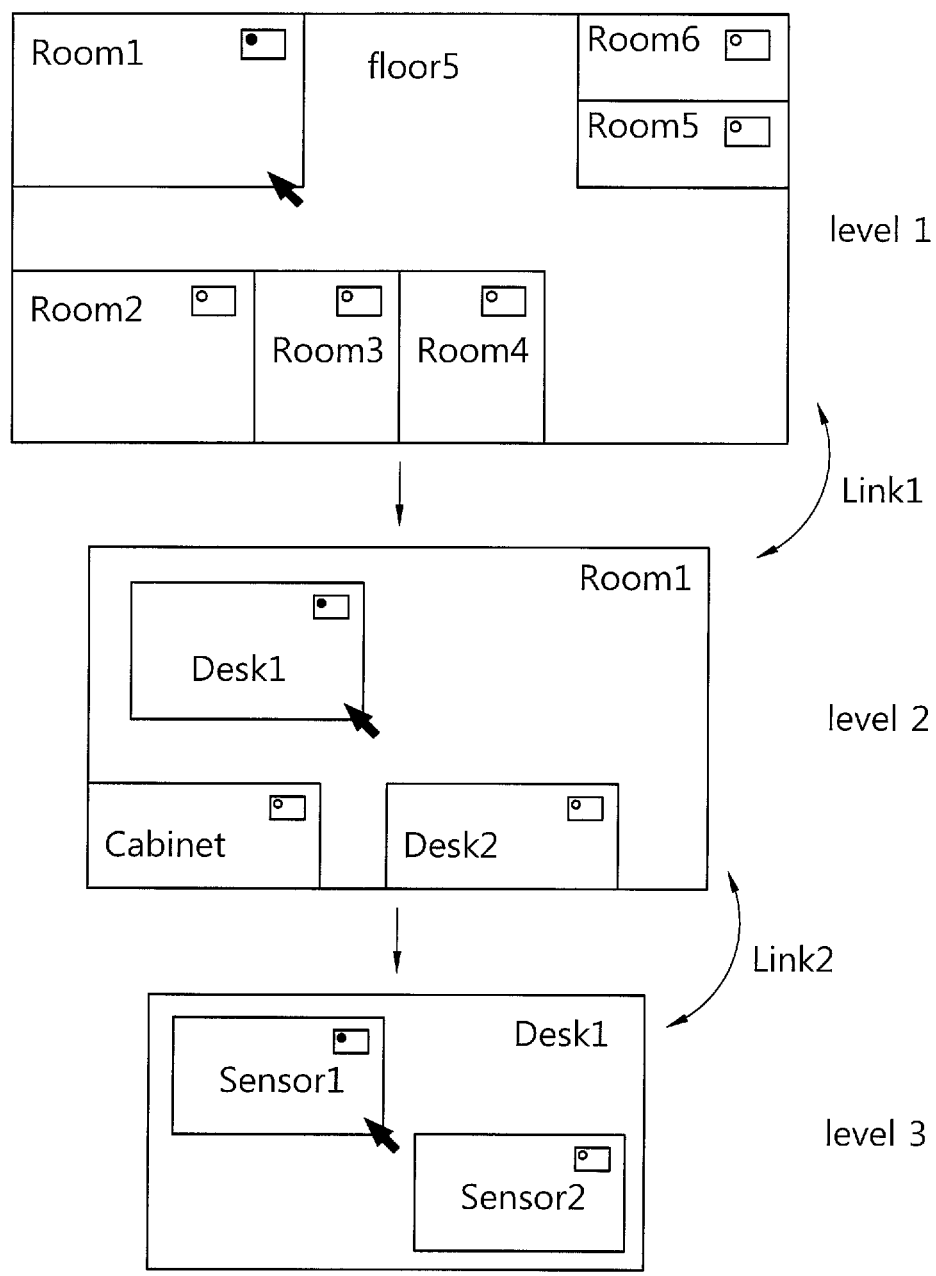
FIG. 3 is a diagram for describing a link relationship between the object of map data and the visualization space and each map.

FIG. 3 is a diagram for describing a link relationship between the object of map data and the visualization space and each map.

Referring to FIG. 3, a plurality of maps may have a link relation with each other. The link between maps may define a depth between levels, and define a relation between levels of a specific data object 310. The data object 310 may be displayed in a predefined shape within a visualization space 320, and may display events such as sensing abnormality by flickering. If clicking (or zooming in) a room 1, where an event occurs in a map of level 1 which is the highest level in a viewer of users, a map of level 2 which is linked (link 1) with the map of level 1 may be displayed. The status information of higher level item may be determined by reflecting the status information of lower level item.

In the map of level 2, a data object of lower level of the room 1 and the visualization space are included, and desks 1 and 2, and a cabinet are included. One object of higher level may be linked with a plurality of objects of lower level, such a link relation between each object and map may also be defined for each map. In addition, the location of linked object may be different for each map of different levels. If clicking the desk 1 where an event is occurring in the map of level 2, a map of level 3 may be displayed by the link (link 2) of level 2 and level 3, and lower sensors (sensor 1 and sensor 2) of desk 1 may be included in the level 3. By following linked map as such, a user may identify that an event is occurring in the sensor 2, which is an object of lowest level.

FIG. 4a is a conceptual diagram for describing a configuration for implementing and storing a time axis in map data according to an embodiment of the present invention.

Referring to FIG. 4a, an integrated 4D data may be implemented through three axes and an additional time axis. That is, since all objects and the visualization space should include a concept of time in order to display 4D integrated data, two axes (x axis and y axis) among the conventional three axes may be configured as a map form of data based on the visualization space, and these plurality of map data may be implemented with being overlapped in z axis direction according to a depth of each level. And then, the maps of different levels may include different time axes, and different objects include respective different time exes in one map, thereby it is implemented that a user may see a plurality of objects on different time axes. In addition, by dividing the visualization space of one map into a plurality of parts, the time axis may be configured for each divided part. As such, by implementing a separate time axis in the various visualization spaces, it is available to increase the degree of freedom of inquiry and search the past data for a specific item by the user later, and it is also available for the user to intuitively visualize data following user's experiences in any degree.

Figure 4B:
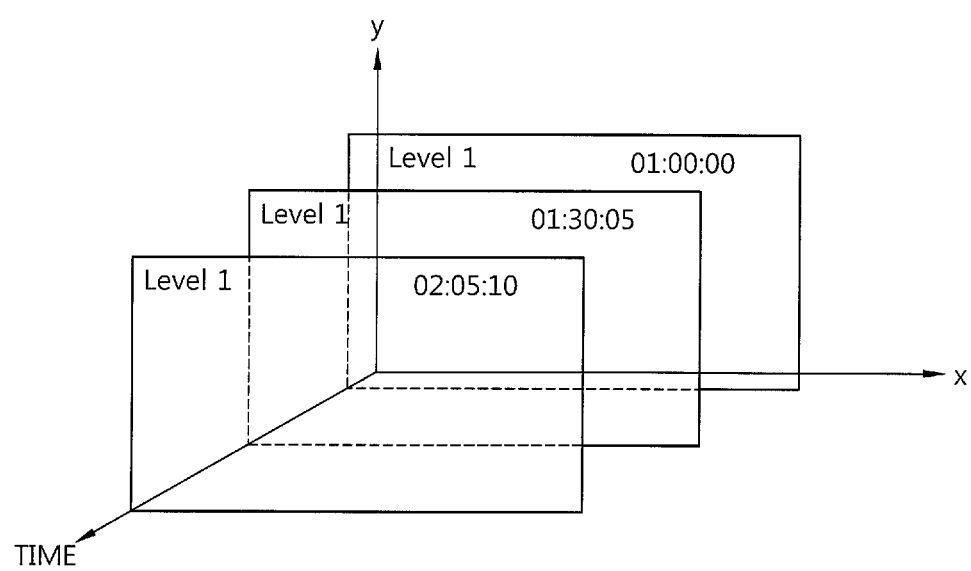
FIG. 4b is a conceptual diagram for describing a configuration implemented by configuring a time axis on z axis of map data according to an embodiment of the present invention.

FIG. 4b is a conceptual diagram for describing a configuration implemented by configuring a time axis on z axis of map data according to an embodiment of the present invention.

Referring to FIG. 4b, by implementing the map form of data based on the visualization space on two axes of three axes while configuring time on z axis, the map data may be visualized such that a single level map data is implemented with the course of time. By implementing such a visualization manner in a plurality of levels, the map data of a level requested by a user may be returned and visualized.

In storing data for integral visualization, layer information, status information and link information may be periodically stored, and the map may be generated automatically or manually. A client may play the stored information by adjusting time axis of the stored information. In addition, the layer information, status information and link information may be collected with a different collecting cycle, and the map generating cycle with the information may be differently configured.

Figure 5:
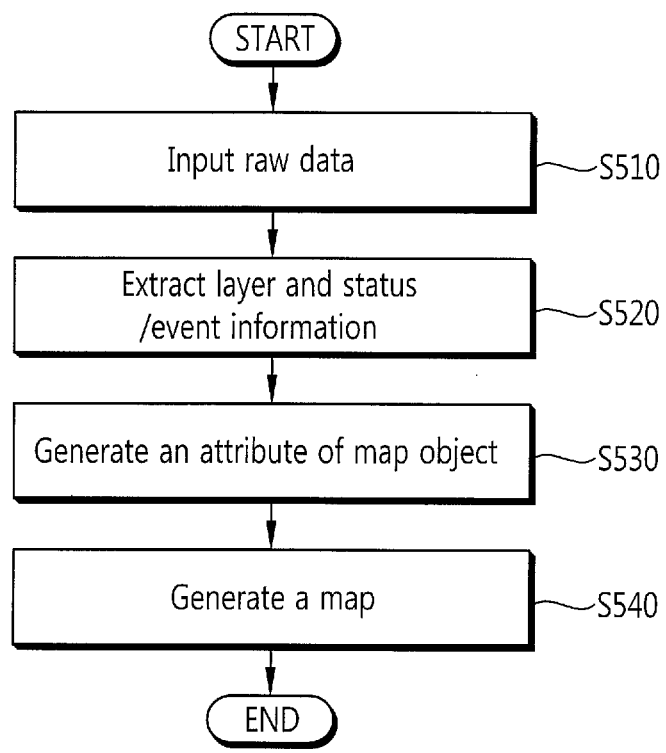
FIG. 5 is a flow chart illustrating a procedure of generating map data according to an embodiment of the present invention.

FIG. 5 is a flow chart illustrating a procedure of generating map data according to an embodiment of the present invention.

Referring to FIG. 5, the map generating server collects and inputs the raw data (S510). Generally, the inputted raw data may have interrelationship. For example, images, temperature, fuel quantity of the same equipment may be exemplified. Even if there is not special interrelationship, they may be objects for generating integrated map data, and the inputted raw data may include all typical/atypical data of different form as well as the images and the text as described above.

The server extracts layer information and status/event information from the inputted raw data (S520). The server may extract the layer information and the status/event information from the inputted raw data. The layer information is information indicating a layer structure of the raw data. For example, the information indicating that the lower layer data of raw data 1 is raw data 2 and 4, and the raw data 2 reserves 5 for the lower layer data, and the like may be included in the layer information. The status information may signify information representing a state of object facility (item). This may be displayed with real figures. The status information may also include the image data. One item may have a plurality of status information. That is, the status information such as temperature, amount of current, hydraulic pressure, monitoring image, etc. may be existed for one item. The event information is information displaying that a specific event (situation) occurs. For example, if the sensing temperature of a specific item is 50° C. and a threshold temperature value of the corresponding item is 40° C., a waning event should be displayed because the threshold temperature value is exceeded, and the event information is such information that represents the generation of an event. That is, the server may extract the layer information and the status/event information from the raw data. Or, in some cases, an external link data may be extracted.

And, an attribute of map object is generated based on the extracted data (S530). The attribute of map object signifies the metadata described above, and referred to as the metadata including the extracted status/event data, and a physical file location, a display location, a color, a font, and a background of the external link data, and the metadata includes a rule script and a location template.

And then, a map may be generated by integrating the tile (background) of data based on the extracted object attribute information (metadata) (S540). Based on the display location among the attribute information of object, the location where the status/event information is to be displayed may be determined. For example, a map may be generated by determining a location of specific image or specific text in the visualization space, a display location of a specific object on the GIS, a display size, and the like. Such location information may be managed by the location template information and the rule script. The server may generate the integrated map data at high speed by implementing a time axis on each of the objects and the visualization space. In addition, a user that watches the map data may search information according to time of the map object through a convenient interface. When the user selects desired items among the map data through the user interface, the user may identify related status information in detail with a pop-up manner. Additionally, the image included in the map data may be magnified with the same resolution regardless of magnification through the POD method.

FIG. 6 illustrates a display showing map data by splitting a plurality of cells in a canvas.

Referring to FIG. 6, it may be implemented that a user may split one canvas into a plurality of cells, and one map data is displayed in a cell. Herein, cell division is not limited to the number of split, and each of the cells may accommodate objects as well as map data. In addition, camera images may be accommodated in the cell.

The cell which is already split may be integrated into one cell again. The integrated cell becomes a canvas eventually. In addition, the screen configuration once split may be template through a bookmark function. The user may easily find the screen configuration again through the template anytime. The cells may provide zoom in/out and panning functions within each region.

Figure 7A:
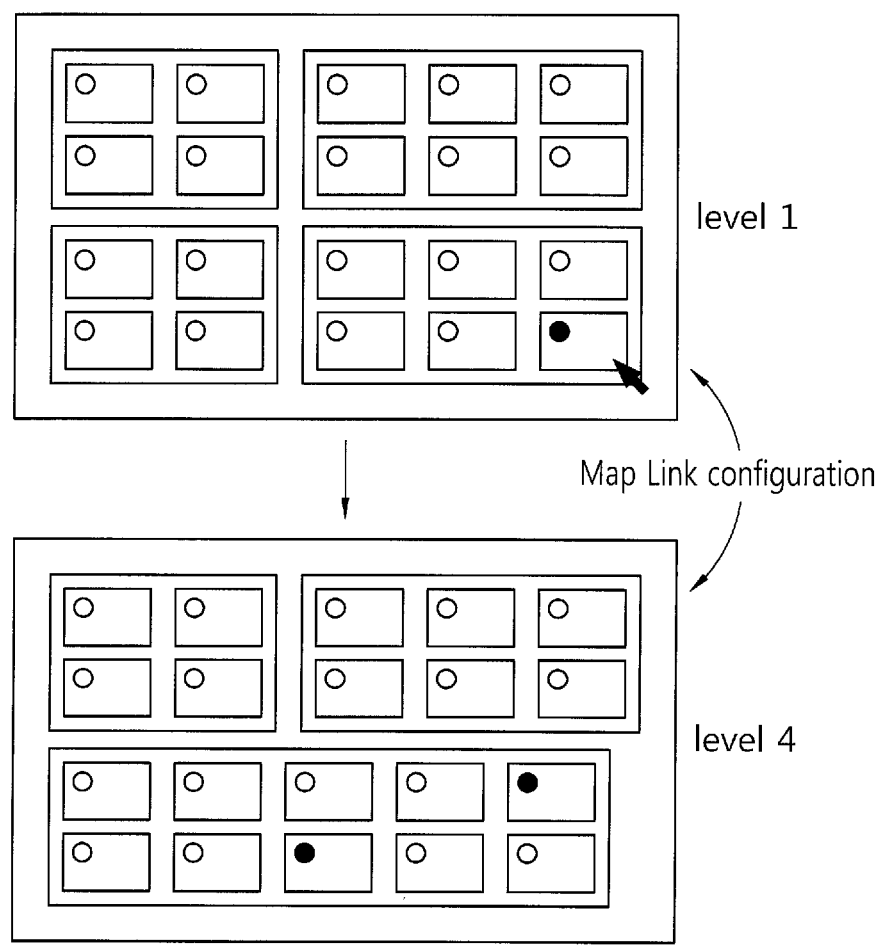
FIG. 7a is a diagram for describing a link relation between maps in a user experience based contents.
Figure 7B:
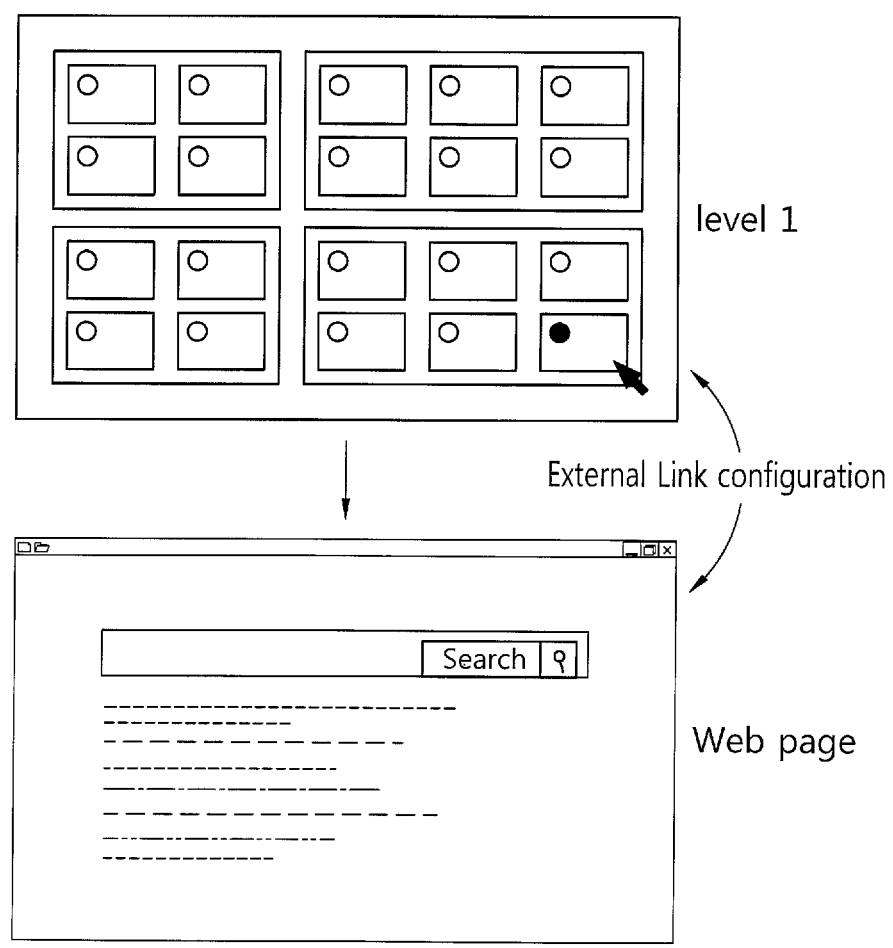
FIG. 7b is a diagram for describing a link relation between a map and an external domain.

FIG. 7a is a diagram for describing a link relation between maps in a user experience based contents, and FIG. 7b is a diagram for describing a link relation between a map and an external domain.

Referring to FIG. 7a, basically, a map may have layer information included in raw data, and may have a sequential and cycled layer structure with inter-level link being configured as a default. In this time, the user may configure specific contents with the user's story telling being included based on the user's experience. The user may regenerate a map link configuration in the order of visualizing several maps. That is, departing from the sequential structure of layer, the layer structure of user convenience may be inputted. For example, it may be configured to move to level 4 from level 1 by one manipulation of mouse, and it also may be configured, when clicking a specific item, that other item, not a lower layer item of the corresponding item, is to be connected. This may be implemented by reconfiguring the map link configuration by the user, and such a contents flow of specific type may be easily visualized with the same content again later by setting as a template.

The embodiment shown in FIG. 7b is illustrated that a map and an external link is connected based on a user's experience, and it may be configured that a specific external link (for example, a web page) is open in response to a mouse manipulation for the map. The external link may be connected to multimedia additional information such as video, sound, flash, etc. and text in addition to the web page.

Figure 8:
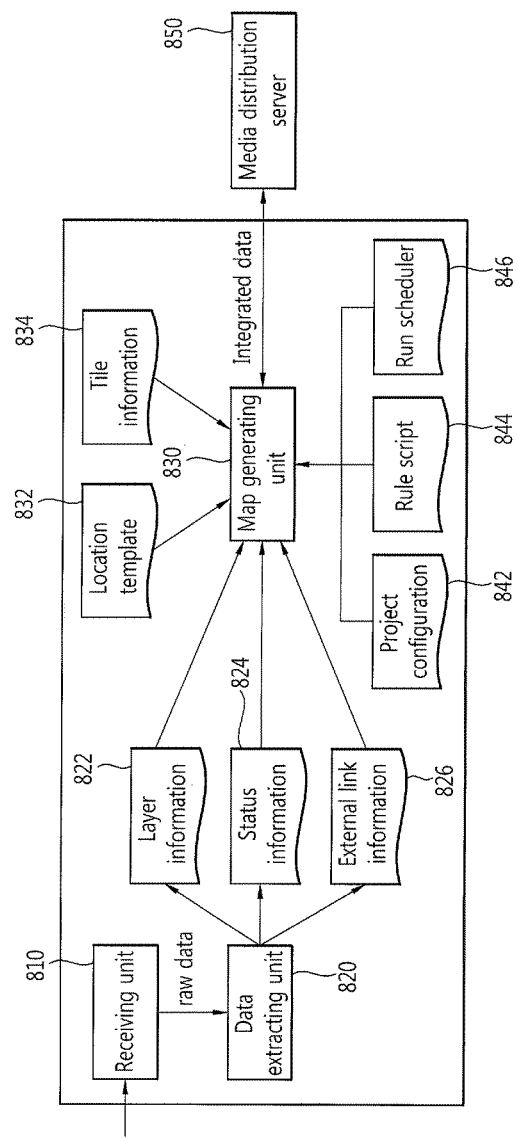
FIG. 8 is a block diagram schematically illustrating an apparatus for generating 4D map data according to an embodiment of the present invention.

FIG. 8 is a block diagram schematically illustrating an apparatus for generating 4D map data according to an embodiment of the present invention. As shown in FIG. 8, an apparatus for generating 4D map data according to an embodiment of the present invention may include a receiving unit 810, a data extracting unit 820, a map generating unit 830 and a media distribution server 850.

Referring to FIG. 8, the apparatus for generating 4D map data may have a configuration that performs the same function as the map generating server (refer to FIG. 1) described above.

The receiving unit 810 may receive various data received from a data providing unit (not shown). The receiving unit 810 may include a communication processor and/or an antenna for receiving data. The receiving unit 810 receives raw data from the data providing unit and transmits it to the data extracting unit 820.

The data extracting unit 820 may extract three sorts of information of layer information 822, status information 824 and external link information from the raw data. The layer information 822 may include information representing layer relation among the respective raw data. This will be described with reference to FIG. 9a to FIG. 9c.

Figure 9A:
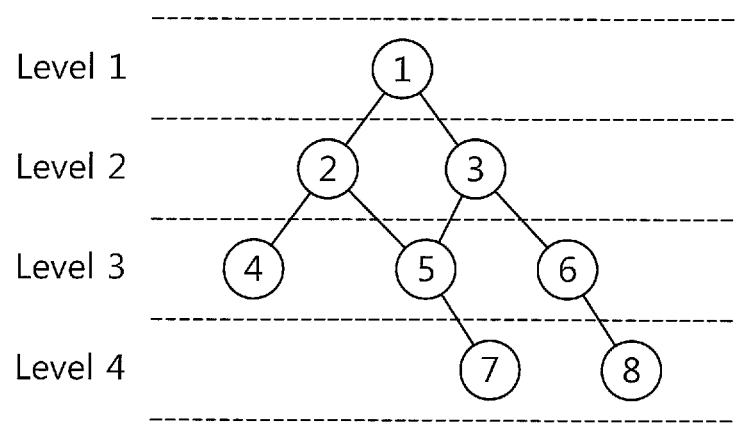
FIG. 9a and FIG. 9b are diagrams illustrating data of layered structure.
Figure 9B:
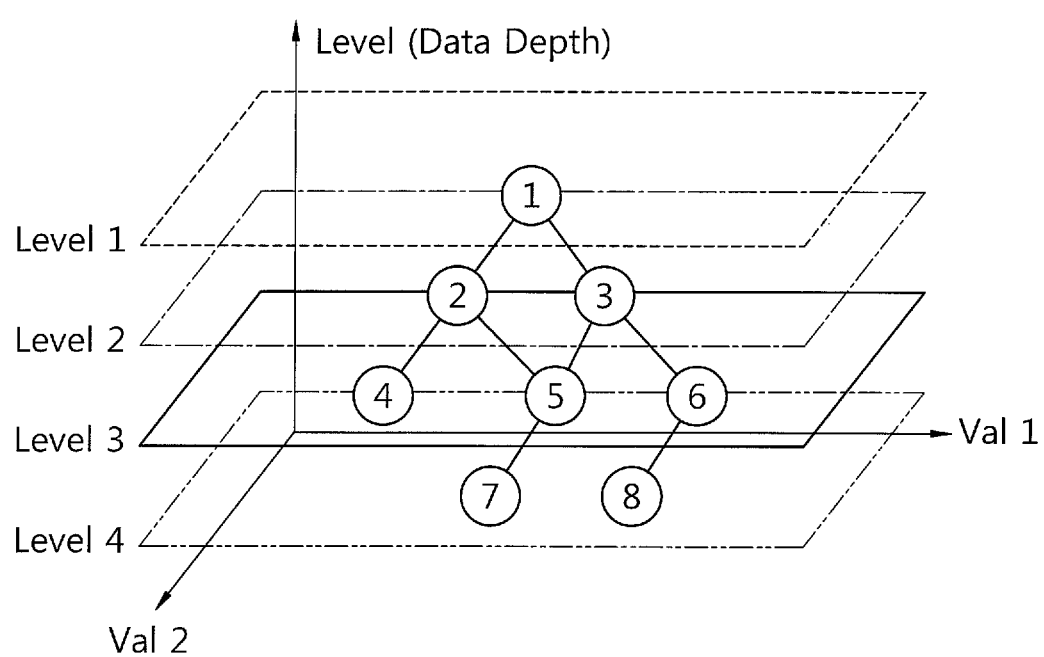

FIG. 9a and FIG. 9b are diagrams illustrating data of layered structure, and FIG. 9c is a diagram illustrating a predefined method displaying data.

Referring to FIG. 9a, the layer information defines a structure of raw data according to each level. For example, information of a first factory of power station may be included in level 1, and information of turbine and protective relay of the first factory of power station may be included in level 2 and level 3, respectively. A lower tree structure for level 2 and level 3 may be included in level 3 and level 4. The level is not limited to level 4. That is, the layer information includes a logical/physical connection relation between higher or lower data of the data having a structure, and is general information to represent this. Through this, basic link relation between maps may be defined.

The data in layer relation may be represented by FIG. 9b. As described above, data for each level is displayed in two axes, and one axis represents a level depth. The data of each level has a separate time axis, which enables the time axis information for each level to be inquired when integrating data later.

In case of independent item having no relation between higher and lower level, the corresponding level may be extracted and visualized. The data structured from root (highest level data) to leaf (connected lower level data) may be visualized by extracting data of requested level. In this time, in one level, only the data of the corresponding level may be displayed (910), the data of the corresponding level and one leaf may be displayed (920), or the data of lower several levels may be structured and displayed (930).

Referring back to FIG. 8, the data extracting unit 820 may extract the status information 824 in addition to the layer information 822. The status information 824 may be information indicating a state of item or information representing an event. In some cases, the status information 824 may also include image information. Hereinafter, this will be described with reference to FIG. 10 in more detail.

Figure 10:
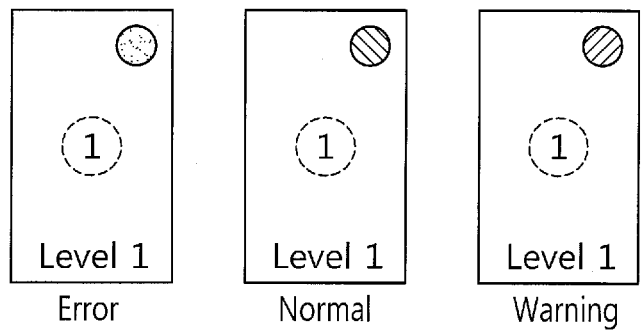
FIG. 10 is a diagram for describing a method of displaying status/event information and a key performance indicator (KPI) on a user interface.

FIG. 10 is a diagram for describing a method of displaying status/event information and a key performance indicator (KPI) on a user interface.

Referring to FIG. 10, the data extracting unit 820 may extract status/event information for all items from the root to the leaf. The event information may be visualized by traffic lights or other display means on the user interface. For example, it may be configured that red light represents an error, green light represents a normal state and yellow light represents a warning. In addition, in order to display an actual numerical value (e.g., actual temperature value (30° C.) in case of temperature related information) and a key performance indicator (KPI) with the status information, as shown in FIG. 10, a metrics table may be simultaneously extracted.

Referring back to FIG. 8 again, the data extracting unit 820 may extract external link data 826 in addition to the layer information 822 and the status information. The external link data 826 is information provided to be mapped to each item by extracting an external linkage URL such that each of the items are connected to other systems.

The map generating unit 830 may generate map data by integrating raw data extracted based on the information of a rule script 844 and a run scheduler 846 with a location template 832, tile information 834 and a project configuration 842.

The location template information 832 may include a plurality of types of cell arrangement information. For example, in one canvas, several type information of a plurality of cell arrangements may be included. In addition, the template information may include link relation information between maps based on user's experience. For example, a predefined type of template that is mapped to specific layer information 822 extracted from the raw data may be determined. For example, in case that the layer information 822 has 4 layers, it may be determined that the layer information belongs to which type of location template among 4 layers through the location template information 832 which is contained (a default type is configurable), and the template having a cell arrangement of the determined predefined type (for example, a third type) and link relation between maps may be defined. Through this, once the template of a specific type that a user wants is generated, the identical screen configuration may easily be rearranged by loading the identical template later.

The tile information 834 stores background information of a user interface. That is, by storing the background information represented as a background in a user interface screen, when the map generating unit 830 generates map data, it may be visualized with the background of collected data.

The information of project configuration 842 includes various configuration information of the project that generates dynamic content in the map generating unit 830.

The rule script 844 defines basic arrangement information of all sorts of objects displayed in a map, colors and fonts of objects that will be displayed in the map, and the like. For the configuration information of the rule script 844, the management including generating new configuration and saving, and deleting the existing configuration, and so on may be accomplished by a rule system.

Additionally, since the cycle of received raw data may be changed continually, the data integrating unit 830 may be equipped with the run scheduler 846, and may execute the data integration by changing the cycle of received data in automatically/manually with a defined schedule. The run scheduler 846 includes task order information from the data extraction to the map generation.

The map data generated through the map generating unit 830 may be controlled through the media distribution server 850. The media distribution server 850 may transmit signals related to display to the client in response to the display request from the client. The map generating unit 830 and the media distribution server 850 may be existed in one server device, or each of them may be existed by being divided into separate servers.

The media distribution serer 850 may implement a viewer and an editor to visualize the generated map data. The viewer implements a zoom in/out function with a method of moving several levels, and implements a panning function in order to see only a required part in one level.

In case of the panning function, when a plurality of cells is partially displayed in the integrated map data, a cell of different region may be weighted toward a direction due to the panning. As such, if an output condition is changed, the media distribution server 850 may provide temporary map data that partially satisfies the changed output condition with a user interface of a client device. That is, since the media distribution server 850 is provided with overall map data, the media distribution server 850 may provide to the client by configuring the changed view which is weighted toward a direction.

That is, the media distribution server 850 may reconfigure the view as much as the amount that a user requires in real time and provide it to the client viewer or the editor.

In the visualization method of 4D data of the present invention, each item on the displayed screen may be implemented to automatically renew the status information through a dynamic status alarm, and implemented to see detailed information such as the KPI, etc. through the pop-up function. In addition, in order to be connected to an external system, a URL link function may be implemented. Additionally, when magnifying a specific item, it may be implemented that the item of a next level related to the item may be seen as well as the zoom in/out may be implemented by simple manipulation of an input system such as a mouse or a touch device.

Figure 11:
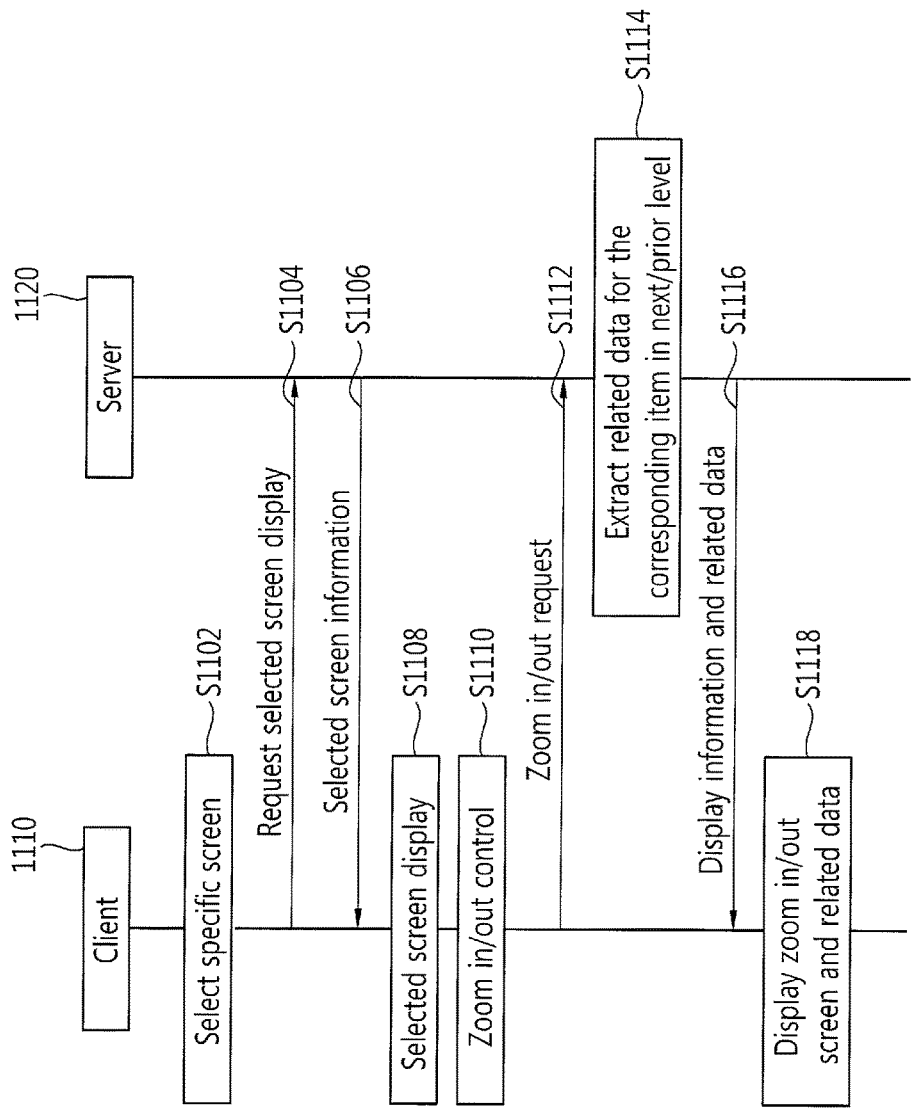
FIG. 11 is a flow chart concretely illustrating a procedure of responding a zoom in/out control for a specific selected screen between a client and a media distribution server.

FIG. 11 is a flow chart concretely illustrating a procedure of responding a zoom in/out control for a specific selected screen between a client and a media distribution server.

In implementing a visualization method of 4D data of the present invention, a mouse, a touch screen and a touch panel may be used in a client 1110, and a movement between levels may be attained by a mouse click, a mouse wheel, a zoom in/out function of a touch (screen or panel) using a finger. And a logical link function between each of the levels may be implemented. That is, in case of magnifying it with a specific item of each level at the center, it may be implemented to automatically display related data that corresponds to the corresponding item in the next map level.

Referring to FIG. 11, in case that the client 1110 selects a specific cell among the several cells included in a canvas (S1102), a display request signal to display a specific map data in the selected cell to a server 1120 (S1104). The server 1120 transmits the map data of selected cell to the client 1110 (S1106). Using a user interface of the client 1110, based on the map data of the selected cell which is transmitted from the server 1120, the corresponding map data is displayed in the selected cell (S1108). In this time, if a user performs a zoom in/out control for a specific item through a user control equipment (for example, a mouse, a touch screen, a touch panel, a key board) (S1110), the client 1110 transmits a zoom in/out request to the server 1120 (S1112), and the server 1120 extracts the related data for the corresponding item in the next/prior level of the corresponding map (S1114). For example, in describing with reference to FIG. 9*a* and FIG. 9*b*, in case of magnifying (3) of level 2, it may be automatically displayed at (5) and (6) in the center, and in case of magnifying (2), it may be displayed at (4) and (5) in the center. That is, the server 1120 transmits the related data for the extracted item and the zoom in/out display information for the visualization space which is zoomed in/out to the client 1110 (S1116), and the client 1110 receives the transmitted information and displays the related data on the zoomed in/out display screen (S1118). As such, it has logical connection structure from higher to lower level.

According to another embodiment of the present invention, even though there is basic logical connection between items, other item may be connected compulsorily. For example, though magnifying item (3), it may be forced to be connected to map (4). In addition, it may be compulsorily connected to a map of the next level by skipping one level. Through this, a user may move to a final leaf level from a root level at one time, and vice versa.

Figure 12:
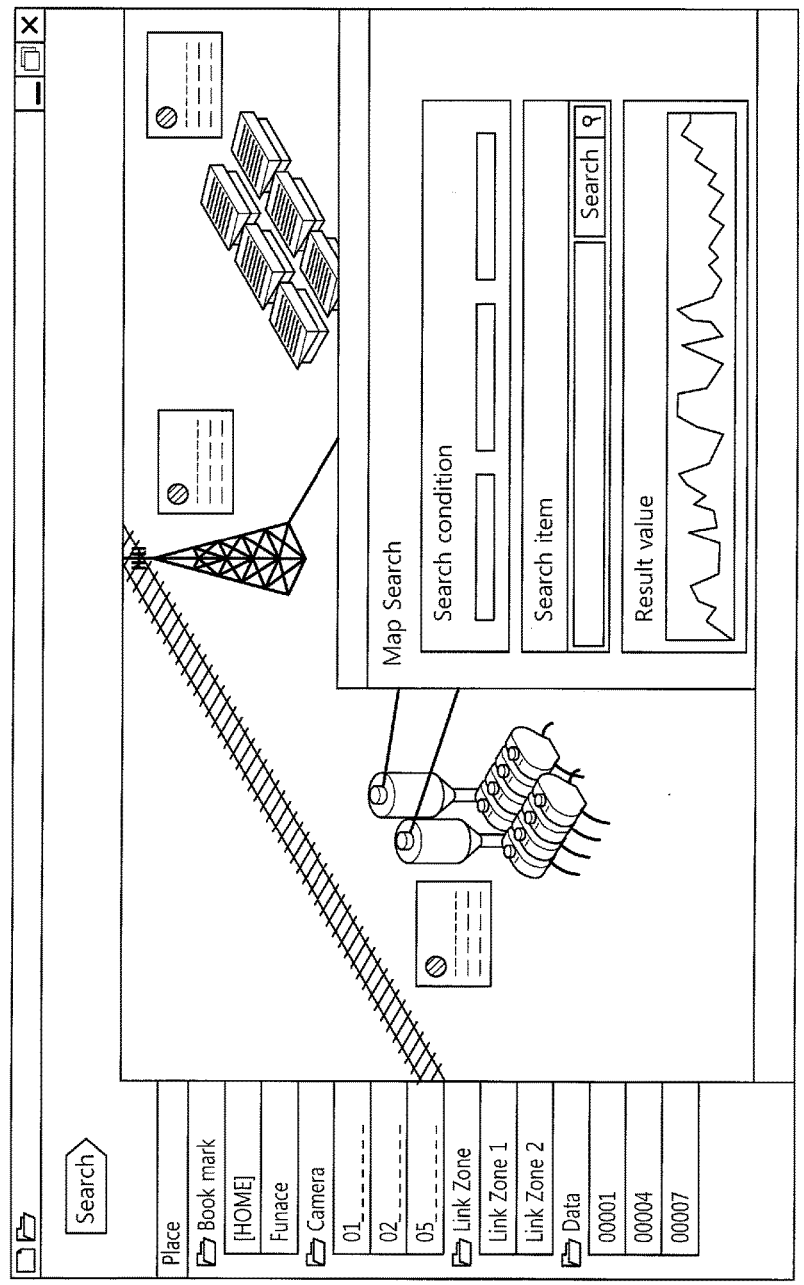
FIG. 12 is a diagram for describing a data search function by an interaction with a user.

FIG. 12 is a diagram for describing a data search function by an interaction with a user.

Referring to FIG. 12, by implementing a data search range of a user is automatically configured to a range of physical screen which is visualized by an interaction, it is available for the user to fast and intuitive manipulation for the data search range with only simple mouse manipulation. That is, in order for data changed with time to be easily searched, if a search condition and a search item are inputted in concentration on a physical screen currently displayed, the search may be performed with only the data on the corresponding screen as a search object, and the resultant value may be returned. In this time, changes in time may also be returned.

Figure 13:
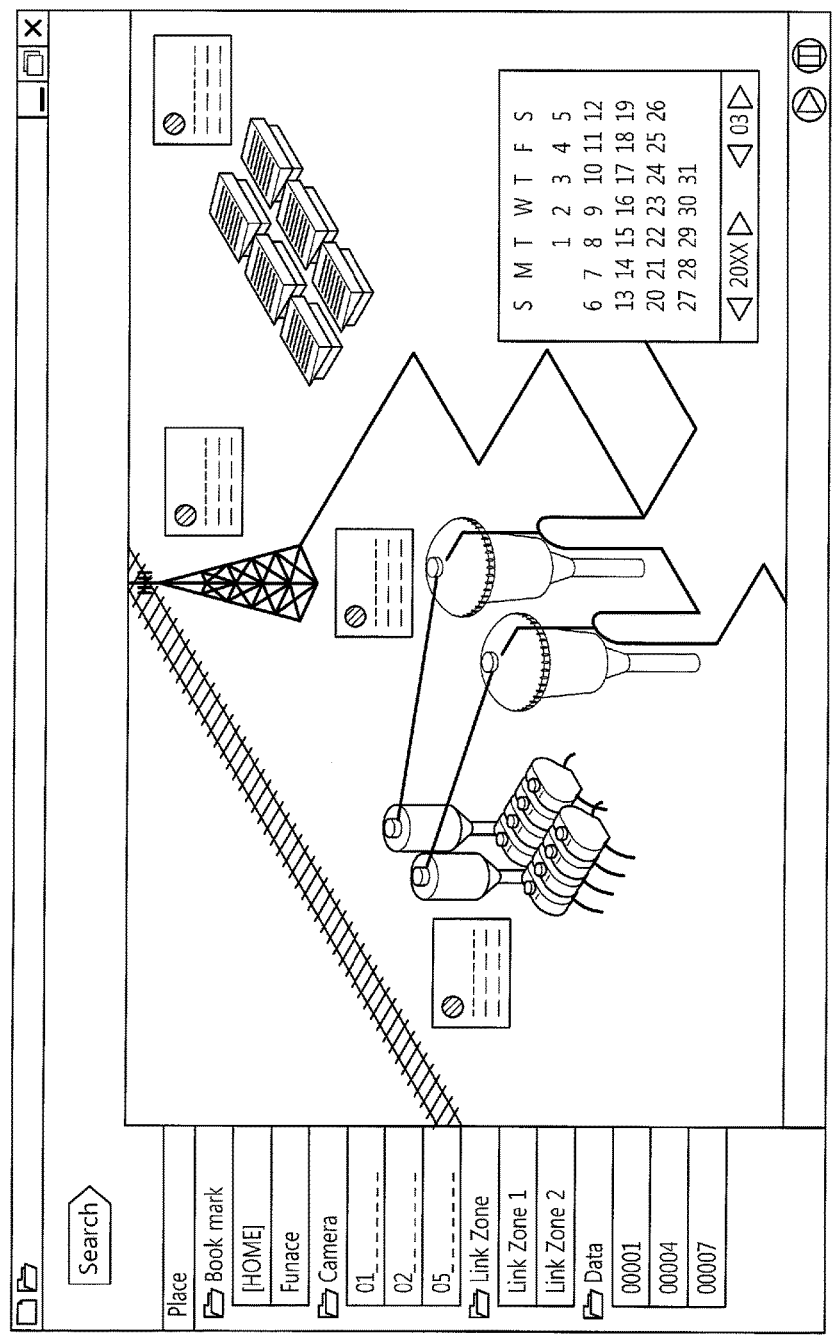
FIG. 13 is a diagram for describing a play inquiry and a playback function according to time by an interaction with a user.

FIG. 13 is a diagram for describing a play inquiry and a playback function according to time by an interaction with a user.

Referring to FIG. 13, map data of all levels have time axes, and a user may playback all items displayed in a map from a specific timing as well as the user may inquire data of past specific item through a change of time axis at any time. That is, each of the items as well as a canvas has a separate time axis, and a time axis of a specific item may be configured separately to a time axis of overall canvas. Through this, an operation playback function, which is a function of integrating a video, a text, an image, a user interaction, etc. and playback may be implemented. That is, a concept of time is included in all visualization spaces, the user may inquire or playback data in user's desired time slot at any time.

Figure 14:
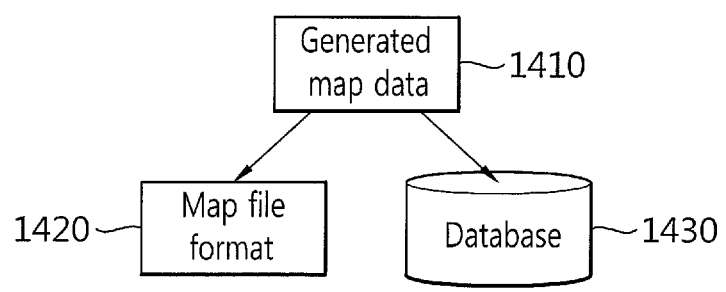
FIG. 14 is a diagram for describing a medium storing generated map data.

FIG. 14 is a diagram for describing a medium storing generated map data.

Referring to FIG. 14, a generated map data 1420 may be stored as a map file format 1420, and may also be stored in a database 1430. The map data 1420 may be generated in the map file format 1420 and placed in a local, and may be placed in a center through the database 1430.

Figure 15:
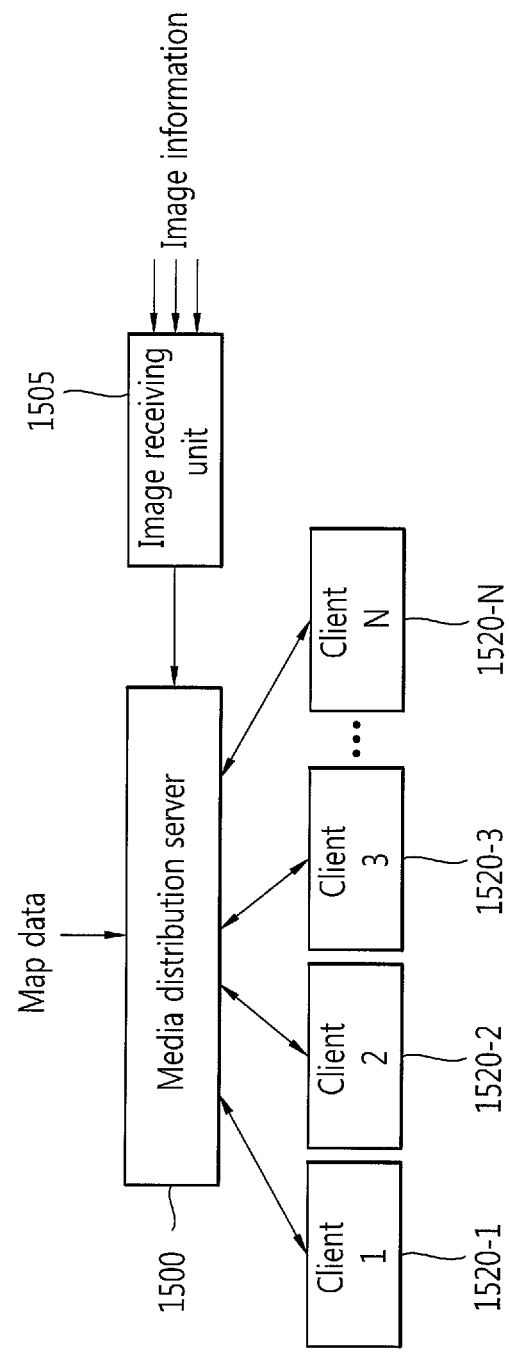
FIG. 15 is a diagram for describing a method of receiving and distributing image data from a separate image receiving unit to a client by a media distribution server according to another embodiment of the present invention.

FIG. 15 is a diagram for describing a method of receiving and distributing image data from a separate image receiving unit to a client by a media distribution server according to another embodiment of the present invention.

Referring to FIG. 15, a media distribution server 1510 may be inputted with image information from a separate image receiving unit 1505 that receives the image information (for example, video information) and may provide it to the client by setting up a link to the map data generated in a map generating server. For example, although an image related to a specific item in the map data may be placed on actual map, otherwise, by separately receiving it from the image receiving unit 1505 and setting up a link to the corresponding item. A user may stream the image through the link to the corresponding item. In this case, an efficiency of storage may be maximized by storing image and video data that occupy large amount of disk in a database, and storing actual map file in a local storage. In addition, an efficiency of interaction of clients 1520-1 to 1520-N may be increased.

Figure 16:
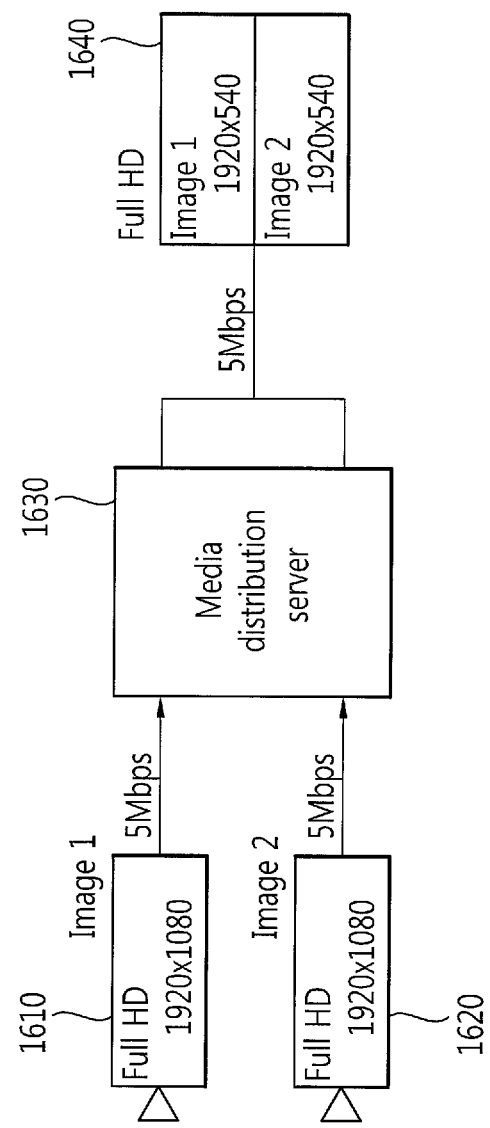
FIG. 16 is a diagram for describing a POD technique that can be applied to a visualization method of map data of the present invention.

FIG. 16 is a diagram for describing a POD technique that can be applied to a visualization method of map data of the present invention. The POD technique is disclosed in Korean patent publication No. 10-2002-0052190 (published on Jul. 2, 2002) and US patent publication No. 10110680 (published on Dec. 19, 2002).

Referring to FIG. 16, in case that a media distribution server 1630 should be displayed with a plurality of images 1610 and 1620 being integrated in a screen of a client 1640, by providing resolutions of a plurality of images 1610 and 1620 that should be integrated through resolution information of the display screen in the client 1640 with being changed, the integrated image may be effectively transmitted to the client 1640 without decreasing a bandwidth. Such a technique is referred to as the POD. In the embodiment of FIG. 16, the situation of transmitting identical full HD images on the display screen of the client 1640 is assumed in an environment that both of an image 1 1610 and an image 2 1620 are full HD and transmitted with 5 Mbps in a resolution of 1920×1080. The media distribution server 1630 transcodes two images 1610 and 1620 based on image quality information in the display screen of the client 1640. That is, each image is transcoded to have a resolution of 1920×540 and a full HD image of 1920×1080 is generated when integrated, thereby the integrated image may be provided with an identical bandwidth of a bandwidth (5 Mbps) that was used when transmitting one image above.

In addition, the IPQ technique that can be applied to a visualization method of map data of the present invention is disclosed in Korean patent publication No. 10-2003-0092955 (published on Jul. 2, 2002) and US patent publication 10345432 (published on Dec. 4, 2013).

The IPQ is a technique that freely edits heterogeneous data such as a video image, a satellite map, status information, etc. through prescribed software (editor), and enables to edit an integrated monitoring and control contents by determining real time monitoring and integrated control scenario. This may be implemented such that large amount of image data is easily zoomed in/out and moved by rapidly transmitting only data of selected local region among overall regions. In addition, in case that a separate bulletin is existed, perfect synchronization with the bulletin may be provided, and a perfect alarm function may be provided by interlocking all of a camera image, a sound warning and connected external equipment control. Additionally, a free screen configuration and contents may be stored through the editor, and a function of processing real time alarm is provided. Further, a function of editing such as locating a video image on a GIS map may be embedded.

So far, the present invention has been described with reference to the drawings and the embodiments, which does not mean the scope of the present invention is not limited thereto, and it should be understood by those skilled in the art, however, that the present invention can be modified or changed in various ways without departing from the technical principles and scope.

What is claimed is:

1. A method for visualizing 4D data by integrating received data, at a server system, comprising:
   a step of extracting data for extracting layer information representing a relation between items, status information representing state or event of each of the items, and connection information enabling each of the items to be related to internal/external system, from received at least one raw data;
   a step of generating contents for generating an object from the extracted information and integrally implementing the generated object in a visualization space; and
   a step of controlling visualization for visualizing and controlling the generated contents,
   wherein each of the object and the visualization space is integrally implemented as 4D data with location information and time information,
   wherein the step of generating contents includes a step of generating a map having a data structure which the object objected from each of the items of the extracted information is integrally implemented in the visualization space,
   wherein each of the map, the object and the visualization space are implemented as 4D data by being integrated with having location information and time information,
   wherein in the step of visualization control, a client visualizes the map through a map editor for editing a visualized screen and a viewer for visualizing the map,
   wherein the canvas of the viewer is distinguished by at least one cell, and wherein one map or at least one object is displayed in the distinguished cell,
   wherein the canvas is usable by dividing a plurality of typical or atypical cells arbitrarily, and divided cell is integrated into one cell and the integrated cell becomes the canvas.

2. The method for visualizing 4D data of claim 1, wherein the raw data includes at least one of an image, a video, a text, GIS information, sensor data, system data and facility data.

3. The method for visualizing 4D data of claim 1, wherein all resources are implemented to be integrated by decreasing network usage, by utilizing a pixel on demand (POD) technique.

4. The method for visualizing 4D data of claim 1, wherein a part of the data is transmitted by controlling a resolution and a transmission quantity of the data transmitted from contents server to a client at one time by using a tile service if required.

5. The method for visualizing 4D data of claim 1, wherein the layer information reflects logical higher and lower relationship in addition to display physical higher and lower relationship of each of the items included in the raw data.

6. The method for visualizing 4D data of claim 1, wherein the status information includes current status information of each of the items and all event information generated from each of the items, and a key performance indicator (KPI) information managed through each of the items.

7. The method for visualizing 4D data of claim 1, wherein the connection information is displayed in the client through interaction with each of the items in the step of visualization control, or has an external linkage address that may be linked with other system.

8. The method for visualizing 4D data of claim 7, wherein consistent visualization space is provided by utilizing the connection information based on the item selected by the client or in a center, when a zoom in/out interaction is requested by the client.

9. The method for visualizing 4D data of claim 1, wherein two axes among three axes for displaying 3D data are displayed as 2D canvas, and one axis is displayed as zoom level displaying a depth, and wherein the map of each of the zoom level visualizes 4D data by being implemented to have time axis.

10. The method for visualizing 4D data of claim 1, wherein each of the objects integrated in the map is displayed by defining attribute, on the 4D visualization space where time is included, and wherein attribute information of the object includes information related to at least one of an actual physical file location, a location on a user interface, a color, a font and a background.

11. The method for visualizing 4D data of claim 1, wherein an integrated file is located in a sharable centralized disk and a link of the file is used in actual map file format, in case of a resource that uses larger amount of disk than a reference value in generating the map.

12. The method for visualizing 4D data of claim 1, wherein a map generating manner has an automatic and manual generating manner, and
   in case of automatic map generation, wherein the map data is generated using location template information for specifying spatial and layer arrangement of the map, tile information for generating background information, project configuration information for generating dynamic contents, a rule script defining the object displayed in the map and a run scheduler determining receiving cycle of the raw data and execution order of map generating operation, which are configuration information for integrating the extracted information.

13. The method for visualizing 4D data of claim 12, in case of manual map generation, wherein all raw data is generated to the object and arbitrarily arranged in the visualization space, and the map is generated manually through an attribute change of each of the objects.

14. The method for visualizing 4D data of claim 1, wherein a state of higher level item is determined by reflecting state value of the lower level item in a plurality of maps.

15. The method for visualizing 4D data of claim 1, wherein the integrated contents including the generated map is provided through one file or a centralized DB system.

16. The method for visualizing 4D data of claim 1, wherein the viewer moves by implementing zoom in/zoom out on the integrated contents that integrate a plurality level of maps vertically/horizontally, and configured to visualize a part required in one level of map through a panning.

17. The method for visualizing 4D data of claim 1, wherein the viewer has a canvas which is a user interface visualization space for displaying the integrated map contents on a user interface, and
   wherein the canvas has a time axis and in which data of specific time slot is inquired and played back through a change of the time axis.

18. The method for visualizing 4D data of claim 16, wherein each of the objects of the integrated map has separate time axis in addition to the canvas of the viewer, and the time axis of each object is configurable separately from the time axis of the canvas.

19. The method for visualizing 4D data of claim 1, wherein the screen configuration once divided is configured to be reconfigured according to later request with being template through a bookmark function.

20. The method for visualizing 4D data of claim 1, wherein each of divided cell of the viewer is implemented to display the map or the object on different time axes.

21. The method for visualizing 4D data of claim 1, wherein in case of magnifying the specific item in the center in the current level visualized in each canvas of the viewer, related data corresponding to the specific item is automatically displayed in a next level.

22. The method for visualizing 4D data of claim 1, wherein a data search range is automatically configured in a range of physical screen currently displayed, in case of searching integrated data in the viewer or the editor.

23. The method for visualizing 4D data of claim 1, wherein the map editor generates contents by changing a link configuration between a plurality of maps or configuring link between a specific map and an external medium.

24. The method for visualizing 4D data of claim 1, wherein the map editor is available to arbitrarily generate or change the layer information, the status information and the connection information between a plurality of maps.

25. The method for visualizing 4D data of claim 1, wherein the layer information, the status information and the connection information are periodically saved when saving data for integrating and visualizing data received from the server system, and
   wherein the client generates the map and playbacks the map by adjusting a time axis of saved information.

26. The method for visualizing 4D data of claim 1, wherein the layer information, the status information and the connection information received from the server system are collected with different collecting cycles and visualized with different map generating cycles.

27. A system for visualizing 4D data by integrating received data, comprising:
   a contents generating server for extracting layer information representing a relation between items, status information representing state or event of each of the items, and connection information enabling each of the items to be related to internal/external system, from received at least one raw data and for generating contents for generating an object from the extracted information and integrally implementing the generated object in a visualization space; and
   a media distribution server for distributing the generated contents,
   wherein each of the object and the visualization space is integrally implemented to 4D data with location information and time information,
   wherein the contents generating server generates a map having a data structure which the object objected from each of the items of the extracted information is integrally implemented in the visualization space,
   wherein each of the map, the object and the visualization space are implemented as 4D data by being integrated with having location information and time information,
   wherein in a visualization control, a client visualizes the map through a map editor for editing a visualized screen and a viewer for visualizing the map,
   wherein the canvas of the viewer is distinguished by at least one cell, and wherein one map or at least one object is displayed in the distinguished cell,
   wherein the canvas is usable by dividing a plurality of typical or atypical cells arbitrarily, and divided cell is integrated into one cell and the integrated cell becomes the canvas.

28. A method for generating a file integrating received data, at a server system, comprising:
   a step of extracting data for extracting layer information representing a relation between items, status information representing state or event of each of the items, and connection information enabling each of the items to be related to internal/external system from received at least one raw data; and
   a step of generating contents file for generating an object from the extracted information and generating in a form of file by integrally implementing the generated object in a visualization space,
   wherein each of the object and the visualization space is integrally implemented to 4D data with location information and time information,
   wherein the step of generating contents file includes a step of generating a map having a data structure which the object objected from each of the items of the extracted information is integrally implemented in the visualization space,
   wherein each of the map, the object and the visualization space are implemented as 4D data by being integrated with having location information and time information,
   wherein in visualization control, a client visualizes the map through a map editor for editing a visualized screen and a viewer for visualizing the map, wherein the canvas of the viewer is distinguished by at least one cell, and wherein one map or at least one object is displayed in the distinguished cell, wherein the canvas is usable by dividing a plurality of typical or atypical cells arbitrarily, and divided cell is integrated into one cell and the integrated cell becomes the canvas.

29. An apparatus for generating file by integrating received data, comprising:

a data extracting unit for extracting layer information representing a relation between items, status information representing state or event of each of the items, and connection information enabling each of the items to be related to internal/external system from received at least one raw data; and a contents file generating unit for generating an object from the extracted information and generating a form of file by integrally implementing the generated object in a visualization space, wherein each of the object and the visualization space is integrally implemented to 4D data with location information and time information, wherein the contents file generating unit generates a map having a data structure which the object objected from each of the items of the extracted information is integrally implemented in the visualization space, wherein each of the map, the object and the visualization space are implemented as 4D data by being integrated with having location information and time information, wherein in visualization control, the client visualizes the map through a map editor for editing a visualized screen and a viewer for visualizing the map, wherein the canvas of the viewer is distinguished by at least one cell, and wherein one map or at least one object is displayed in the distinguished cell, wherein the canvas is usable by dividing a plurality of typical or atypical cells arbitrarily, and divided cell is integrated into one cell and the integrated cell becomes the canvas.

30. A method for visualizing 4D data by integrating received data, at a server system, comprising:

a step of extracting data for extracting layer information representing a relation between items, status information representing state or event of each of the items, and connection information enabling each of the items to be related to internal/external system from received at least one raw data;

a step of generating contents for generating an object from the extracted information and integrally implementing the generated object in a visualization space; and a step of providing visualization tool for providing a client viewer or an editor enabling the client to control the visualization space, wherein each of the object and the visualization space is integrally implemented to 4D data with location information and time information, wherein the step of generating contents includes a step of generating a map having a data structure which the object objected from each of the items of the extracted information is integrally implemented in the visualization space, wherein each of the map, the object and the visualization space are implemented as 4D data by being integrated with having location information and time information, wherein the canvas of the client viewer is distinguished by at least one cell, and wherein one map or at least one object is displayed in the distinguished cell, wherein the canvas is usable by dividing a plurality of typical or atypical cells arbitrarily, and divided cell is integrated into one cell and the integrated cell becomes the canvas.

* * * * *